Mar. 27, 1923.

J. MARFISI.
POP CORN MACHINE.
FILED AUG. 6, 1921.

Inventor
John Marfisi
By Philip A. H. Terrell
his Attorney

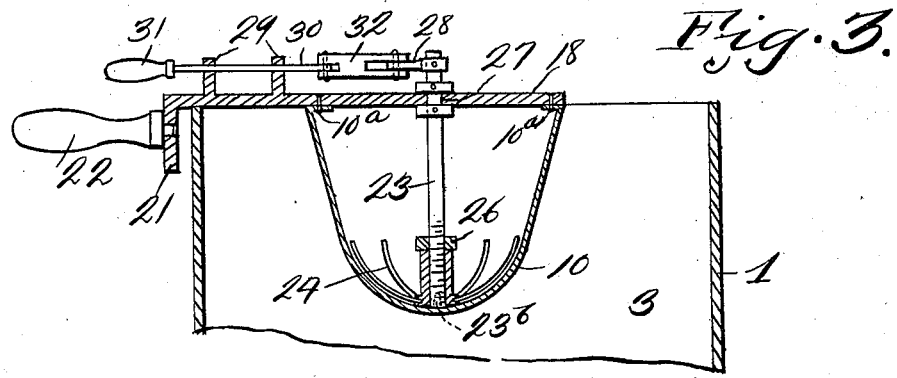
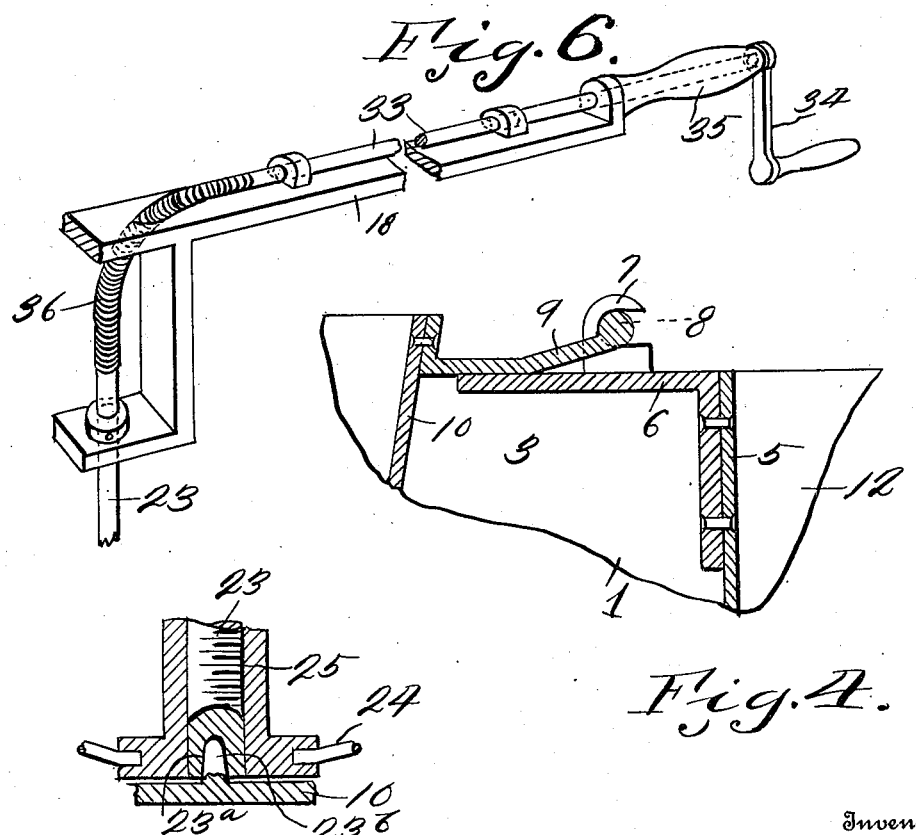

Patented Mar. 27, 1923.

1,449,687

UNITED STATES PATENT OFFICE.

JOHN MARFISI, OF OMAHA, NEBRASKA.

POP-CORN MACHINE.

Application filed August 6, 1921. Serial No. 490,427.

*To all whom it may concern:*

Be it known that JOHN MARFISI, a citizen of the United States, residing at Omaha, in the county of Douglas and State of Nebraska, has invented certain new and useful Improvements in Pop-Corn Machines, of which the following is a specification, reference being had therein to the accompanying drawing.

The invention relates to popcorn machines and has for its object to provide a device of this character which may be moved from place to place, and comprising a rectangular shaped casing having pivotally mounted at the upper end of a chamber therein a vertically disposed receptacle, said receptacle being provided with an agitator and means whereby said agitator may be oscillated during a corn popping operation. Also to provide a casing with a compartment adjacent one side thereof and into which compartment the popped corn may be dumped by pivoting the receptacle and its agitator upwardly.

A further object is to provide the receptacle adjacent the heating chamber with a screened false bottom onto which the popped corn is disposed. Also to provide a foldable shelf having a rack for display of bags of popped corn.

A further object is to provide a fuel tank having pipe connections with a burner disposed beneath the receptacle and with a pressure gage whereby the pressure within the fuel tank may be ascertained and fuel furnished the burner.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 3 is a transverse sectional view through the receptacle and upper end of the casing showing the agitator in the receptacle.

Figure 4 is an enlarged longitudinal vertical sectional view through the receptacle carried member and its supporting bracket.

Figure 5 is an enlarged sectional view through the lower end of the agitator showing its bearing connection with a lug carried by the lower end of the receptacle.

Figure 6 is a modified form of agitator operating mechanism wherein a flexible shaft is used for rotating the agitator shaft.

Figure 1:
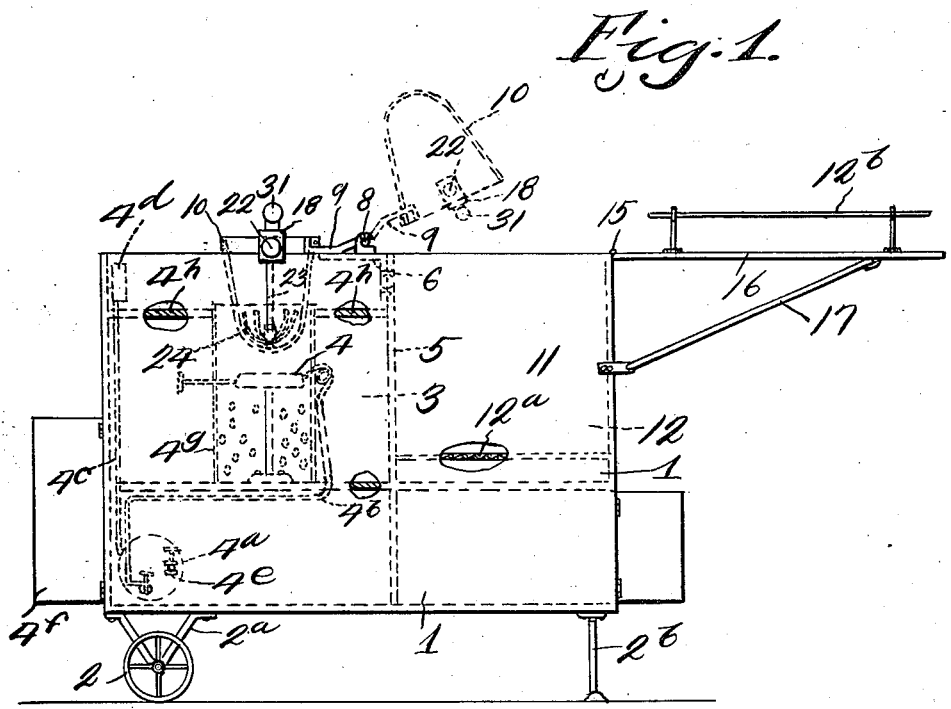
Figure 1 is a side elevation of the popcorn machine showing the receptacle in dotted lines in position for discharging its contents into the storage compartment.

Referring to the drawings, the numeral 1 designates a rectangular shaped casing, which casing is supported on wheels 2 carried by removable brackets $2^a$ adjacent one end of the casing and removable legs $2^b$ adjacent the other end of the casing. The wheels 2 form means whereby the device as a whole may be moved from place to place as desired. The casing 1 is provided with a heating chamber 3 in which is disposed a burner 4, said burner being of any construction and provided with fuel from a fuel supply tank $4^a$ located in the bottom of the casing 1. Fuel supply tank $4^a$ has connected thereto a pipe $4^b$, which pipe supplies fuel to the burner 4 and a pipe $4^c$ which has connected thereto a conventional form of pressure gage $4^d$, by means of which gage the pressure within the fuel supply tank $4^a$ may be ascertained at all times. Fuel tank $4^a$ is provided with a valve $4^e$ through which valve air may be forced into the tank $4^a$ for feeding fuel through the pipe $4^b$ to the burner 4. The casing 1 adjacent the fuel tank $4^a$ is provided with a door $4^f$, whereby access may be had to the fuel tank and to the interior of the heating chamber 3. Disposed around the burner 4 is a perforated hood $4^g$, which protects the burner and at the same time allows sufficient oxygen for perfect combustion to reach the burner 4 through the apertures within the hood. Extending across the heating chamber 3 adjacent the upper end of the hood $4^g$ are shelves $4^h$, which shelves may be utilized for any purpose, however, preferably for holding corn to be popped.

Secured to the wall 5 of the casing 1 is a horizontally disposed rearwardly extending bracket 6, said bracket being provided with upwardly extending ears 7, in which ears the pintles 8 of the bracket 9, which is secured to the receptacle 10, are mounted. Bracket 9 is limited in its downward movement by engagement with the rearwardly extending bracket 6, thereby maintaining the receptacle 10, in which popcorn is placed, in a vertical position and centered over the burner 4 and in the upper end of the perforated hood 4ᵍ.

Figure 2:
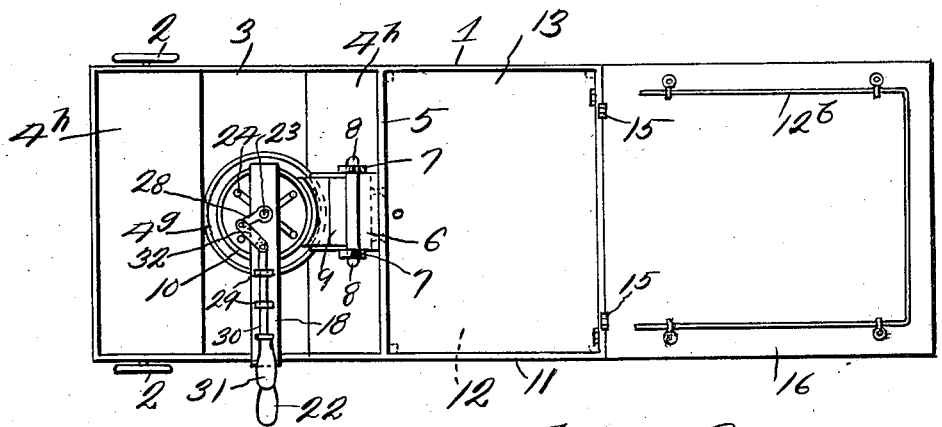
Figure 2 is a top plan view of the popcorn machine.

The casing 1 is provided with an extension 11 having a chamber 12 therein, said chamber 12 being normally closed by a cover 13, and into which chamber the corn after the same has been popped is dumped by the operator by tilting the receptacle 10 to the position shown in dotted lines in Figure 1, thereby allowing batches of corn as it is popped to be discharged into the chamber 12 and onto the screened bottom 12ᵃ, from which chamber it can be removed as desired, placed in bags and disposed in a removable rack 12ᵇ. By forming the chamber 12, adjacent the chamber 3, it will be seen that the popcorn will be maintained heated by the heat radiated from the chamber 3, thereby maintaining the corn warm at all times. Hingedly connected at 15 to the outer edge of the extension 11 is a horizontally disposed member 16, which member when extended as shown in Figures 1 and 2 forms a counter on which the rack 12ᵇ is disposed for use in vending popcorn. The member 16 is held in horizontal supported position by means of the handle 17 which is pivoted to the extension 11 and forms means not only for supporting the counter 16 but also forms a handle member whereby the machine as a whole may be moved from place to place. When the machine is moved from place to place the counter 16 is folded over after the rack 12ᵇ has been removed, said counter 16 being folded over onto the top of the casing 1. This will leave the handle member 17 in a position where it can be utilized for pulling or pushing the machine as a whole.

Extending across the receptacle 10 and secured thereto by means of rivets 10ᵃ is a bar 18, one end of which is provided with a downwardly extending flange 21, to which flange is secured a handle 22 adapted to be grasped by the operator during a tilting of the receptacle 10. Bar 18 has rotatably mounted therein a vertically disposed shaft 23 which extends into the receptacle 10 and is provided with an agitator 24. The agitator 24 is threaded as at 25 on the lower end of the shaft 23 and held against rotation thereon by means of lock nut 26. The upper end of the shaft 23 extends through an aperture 27 in the bar 18 and has secured thereto an arm 28. Extending upwardly from the bar 18 adjacent its handle end are spaced lugs 29, in bearings of which lugs the horizontally disposed shaft 30 is slidably mounted, said shaft being provided with a handle member 31 adapted to be grasped by the operator for reciprocating the shaft 30. The inner end of the shaft 30 is connected to the end of the arm 28 by means of the link 32, and it will be seen that when the shaft 30 is reciprocated that the arm 28 will be oscillated thereby oscillating the agitator 24 within the receptacle 10 during a corn popping operation. The lower end of the shaft 23 is provided with a recess 23ᵃ for the reception of a lug 23ᵇ carried by the inner side of the receptacle 10, thereby forming a bearing on which the agitator will swing during an agitating operation.

Referring to Figure 6 wherein a modified form of operating mechanism is provided instead of an oscillating mechanism, a rotatable agitator shaft 23 is provided, which shaft is rotated by means of a drive shaft 33 operated by a crank 34, said shaft 33 extending through the handle 35 and having a flexible shaft connection 36 with the upper end of the agitator shaft 23. It will be seen that the operator may grasp the crank 34 and rotate the vertically disposed agitator shaft 23. The operation is the same as in the other form during a dumping operation.

From the above it will be seen that a popcorn machine is provided which is simple in construction, provided with an agitating element and so constructed that the same may be formed into a compact structure and transported from place to place as desired.

The invention having been set forth what is claimed as new and useful is:—

A popcorn machine comprising a casing having a chamber therein, an extension carried by said casing and having an auxiliary chamber therein, said chambers being separated by a wall, a horizontally disposed bracket carried by said wall and extending into the chamber of the casing, a member pivoted to upstanding ears carried by said horizontally disposed bracket, a popcorn receiving receptacle carried by said pivoted member, a heating element disposed within the chamber of the casing, said popcorn receiving receptacle being proportioned whereby when it is swung upwardly on its pivotal point the contents thereof will be dumped into the auxiliary chamber.

In testimony whereof I hereunto affix my signature.

JOHN MARFISI.